(12) United States Patent
Gutknecht

(10) Patent No.: US 7,415,878 B2
(45) Date of Patent: Aug. 26, 2008

(54) BALL BEARING TURBOCHARGER BALANCER

(75) Inventor: Daniel A Gutknecht, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 197 days.

(21) Appl. No.: 11/467,071

(22) Filed: Aug. 24, 2006

(65) Prior Publication Data

US 2008/0047344 A1    Feb. 28, 2008

(51) Int. Cl.
*G01M 1/04* (2006.01)
(52) U.S. Cl. .......................................... 73/455; 73/476
(58) Field of Classification Search ................ 73/455, 73/462, 473, 476, 477
See application file for complete search history.

(56) References Cited

U.S. PATENT DOCUMENTS

| | | | | |
|---|---|---|---|---|
| 4,930,348 A | * | 6/1990 | Bandhopadhyay et al. | .... 73/472 |
| 4,976,147 A | * | 12/1990 | Okochi et al. | .................. 73/455 |
| 5,610,332 A | * | 3/1997 | Tornquist et al. | .............. 73/455 |

* cited by examiner

*Primary Examiner*—John E Chapman
(74) *Attorney, Agent, or Firm*—Lee & Hayes LLP

(57) ABSTRACT

An exemplary method for balancing a rotating assembly of a turbocharger, where the rotating assembly includes a shaft rotatably supported by a bearing cartridge, includes loading the rotating assembly to introduce a tilt between the rotational axis of an inner race of the bearing cartridge and a bore axis of an outer race of the bearing cartridge, rotating the inner race with respect to the outer race at a rotational speed less than approximately 5,000 rpm while maintaining the tilt at substantially constant angle and measuring dynamic unbalance of the rotating assembly. Various other exemplary devices, systems, methods, etc., are also disclosed.

30 Claims, 6 Drawing Sheets

BALL BEARING TURBOCHARGER BALANCER

TECHNICAL FIELD

Subject matter disclosed herein relates generally to turbomachinery for internal combustion engines and, in particular, to techniques for balancing rotating turbomachinery components.

BACKGROUND

During turbocharger manufacture, balancing typically occurs for one or more individual components, one or more component assemblies or a combination of both. For example, consider a center housing rotating assembly (CHRA) that includes a turbine wheel and a compressor wheel attached to a shaft rotatably supported in a center housing by a bearing. In this example, component balancing of the turbine wheel and the compressor wheel may occur followed by assembly of the CHRA and assembly balancing of the CHRA.

With respect to assembly balancing of a CHRA, techniques exist for low-speed balancing and for high-speed balancing where the choice of technique typically depends on a turbocharger's bearing characteristics. For example, non-preloaded and centrifugally pre-loaded angular contact ball bearing cartridges typically experience "walking" at low rotational speeds, which can confound low-speed balancing (e.g., by causing unpredictable variations in measurements); thus, for such bearing cartridges, CHRA balancing normally occurs at high rotational speeds.

A need exists for technology that facilitates balancing of turbochargers. In particular, a need exists for technology that allows for low-speed balancing of non-preloaded and centrifugally pre-loaded angular contact ball bearing cartridges, for example, technology that can stabilize a bearing system to thereby allow for more accurate measurements at low rotational speeds. Various exemplary devices, methods, systems, etc., disclosed herein aim to meet these needs and/or other needs.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers.

Figure 1:
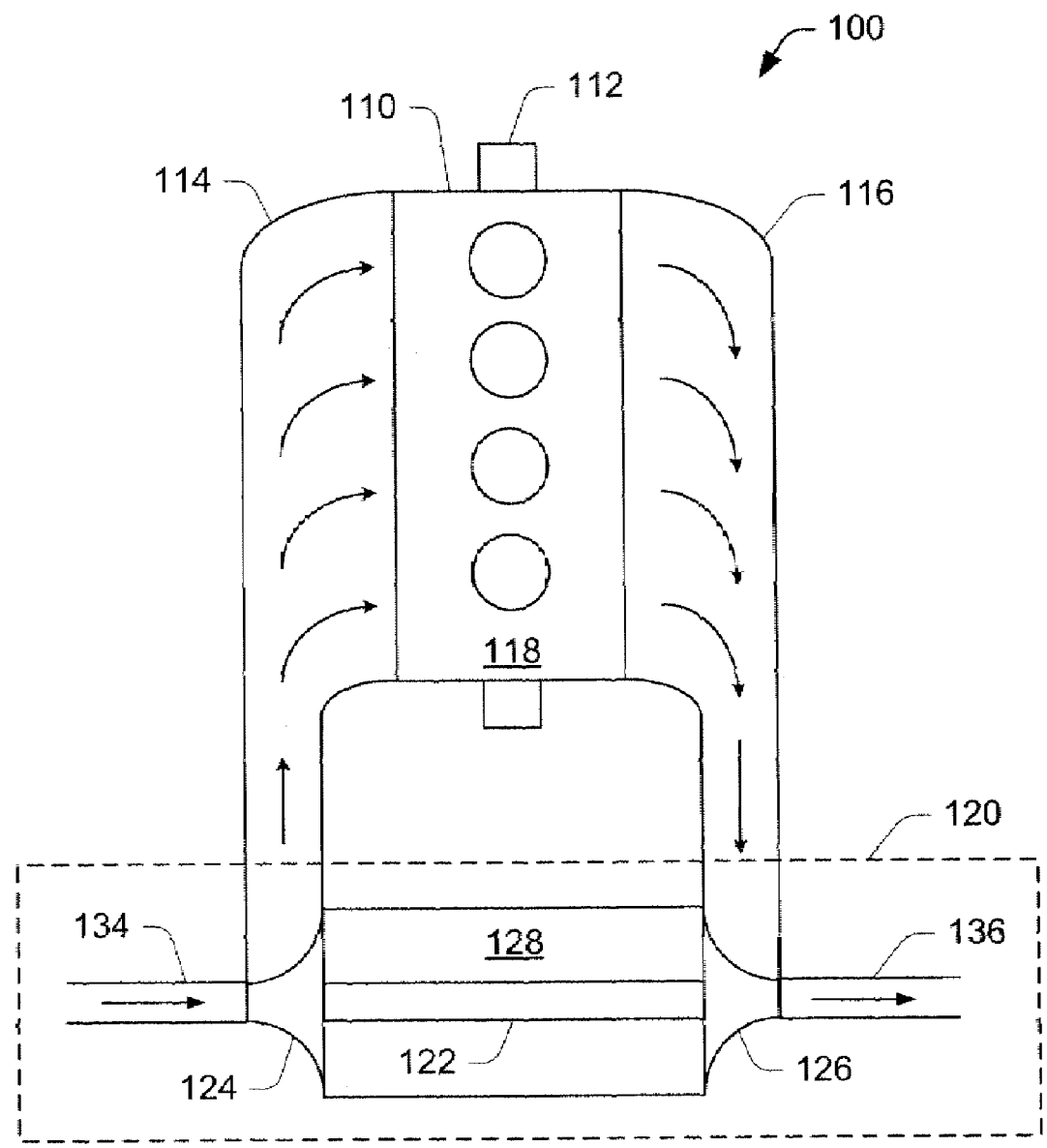
FIG. 1 is a diagram of a conventional turbocharger and internal combustion engine.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
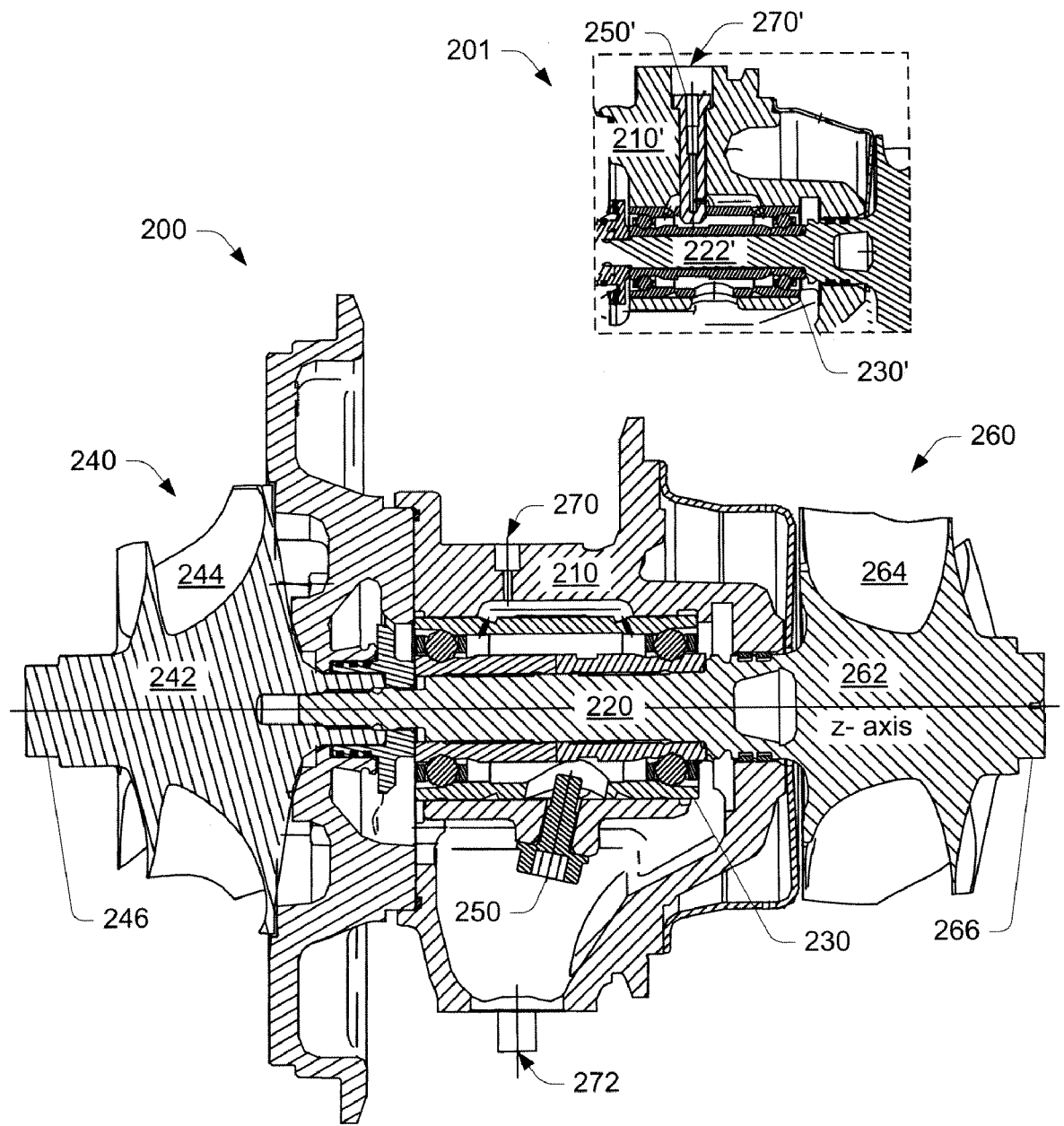
FIG. 2 is a cross-sectional view of a prior art turbocharger that includes a bearing cartridge with an anti-rotation mechanism and a cross-sectional view of an alternative anti-rotation mechanism.

FIG. 2 shows a cross-section of a prior art turbocharger 200 suitable for use as the turbocharger 120 of FIG. 1. The turbocharger 200 serves as a non-limiting example to describe various exemplary devices, methods, systems, etc., disclosed herein. The turbocharger 200 includes a center housing 210, a shaft 220, a compressor wheel 240 and a turbine wheel 260 where the compressor wheel 240 and the turbine wheel 260 are operably connected to the shaft 220. The compressor wheel 240, the turbine wheel 260 and the shaft 220 have an axis of rotation substantially coincident with the z-axis. The center housing 210 supports a bearing cartridge 230 that receives the shaft 220 and allows for rotation of the shaft 220 about the z-axis.

The compressor wheel 240 includes a hub 242 and a plurality of blades 244. The hub 242 terminates at a nose end 246, which may be shaped to facilitate attachment of the wheel 240 to the shaft 220. For example, the nose end 246 may include features to accept a socket or a wrench (e.g., consider a hexagonal shape). The turbine wheel 260 includes a hub 262 and a plurality of blades 264. The hub 262 terminates at a nose end 266, which may be shaped to facilitate attachment of the wheel 260 to the shaft 220. For example, the nose end 266 may have features to accept a socket or a wrench (e.g., consider a hexagonal shape).

The shaft 220 includes a compressor shaft portion that extends into a bore of the compressor wheel hub 242. While the example of FIG. 2 shows a "boreless" compressor wheel (i.e., no through bore), other types of compressor wheels may be used. For example, a compressor wheel with a through bore or full bore typically receives a shaft that accepts a nut or other attachment mechanism at the nose end 246 of the hub 242. Such an attachment mechanism may include features to accept a socket or a wrench (e.g., consider a hexagonal shape).

The center housing 210 includes a bore for receipt of the bearing cartridge 230, a lubricant inlet 270 and a lubricant outlet 272 that allow lubricant flow to the bearing cartridge 230. In the arrangement of FIG. 2, a lubricant film exists between portions of the bore and portions of the bearing cartridge 230, which allow the bearing cartridge 230 to "float" in the bore. An anti-rotation mechanism relies on a pin or bolt 250 received by and extending through an opening of the housing 210. The mechanism further relies on an opening in the bearing cartridge 230 that receives the bolt 250. As shown in FIG. 2, the anti-rotation mechanism allows for some small amount of rotation of the bearing cartridge 230 about the z-axis in a manner that does not hinder flotation of the bearing cartridge 230 by the lubricant film.

The alternative arrangement 201 relies on a pin or bolt 250' that allows for lubricant flow from an lubricant inlet 270' to the bearing cartridge 222' (e.g., via a channel or path through and/or around a pin or bolt) and that limits rotation of the bearing cartridge 222' about the z-axis in a manner that does not hinder flotation of the bearing cartridge 222' in the housing 210'. The pin or bolt 250' may allow for some small amount of rotation of the bearing cartridge 230' in the housing 210'.

Figure 3:
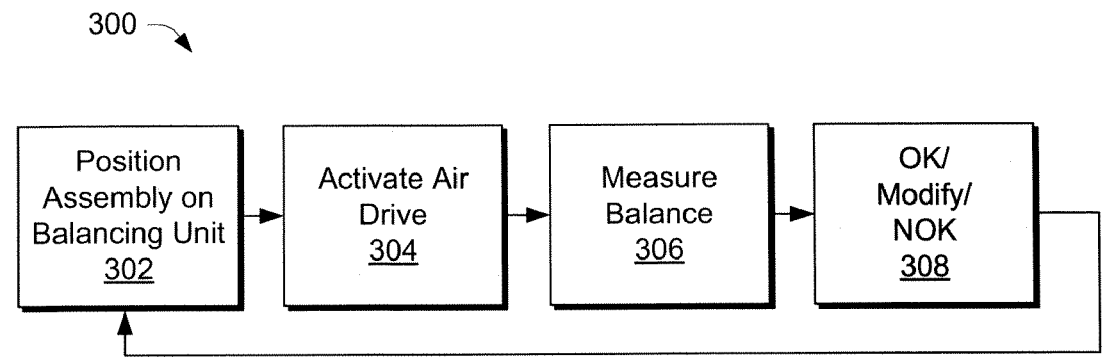
FIG. 3 is a block diagram of a prior art method and a cross-sectional view of a bearing cartridge to illustrate undesirable movements introduced by the method.
Figure 3:
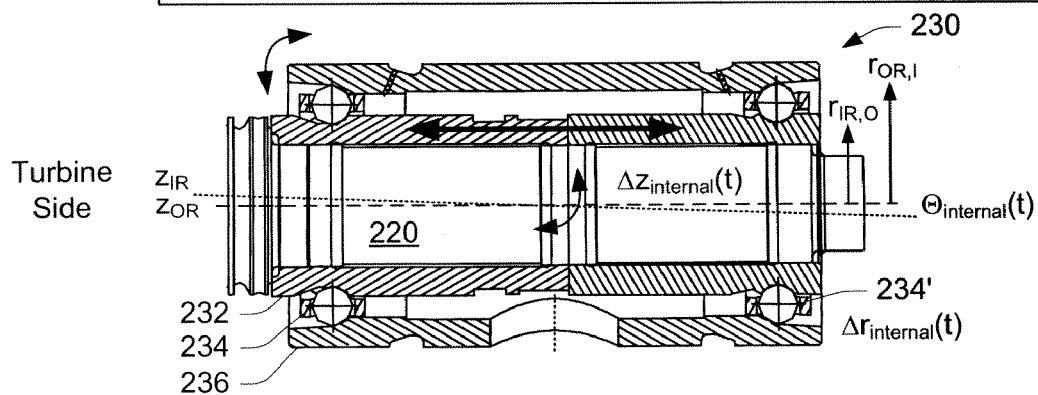

FIG. 3 shows a prior art balancing method 300 with reference to a cross-sectional view of an assembly that includes the shaft 220 and the bearing cartridge 230 of FIG. 2. The method 300 commences in a positioning step 302 that includes positioning an assembly on a balancing unit. With respect to commercially available balancing units for turbocharger assemblies, the company Schenck RoTec GmbH (Darmstadt, Germany) markets various balancing machines for turbocharger core assemblies (e.g., horizontal balancing machines such as MBRS series). Such balancing machines operate at low-speed for acquiring dynamic unbalance measurements of a turbocharger core assembly, for example, prior to high-speed balancing of a core assembly. Such machines typically include one or more transducers for acquisition or sensing of information (e.g., movement, velocity, force, etc.) for use in balancing.

According to the method 300, an activation step 304 activates an air drive that directs compressed air toward a turbine wheel or a compressor wheel to cause rotation of the rotating components. A measurement step 306 commences once the rotating components achieve a desired speed. In general, rotational speed for low-speed balancing does not exceed about 5,000 rpm.

An action step 308 represents some possible actions following the measurement step 306. For example, the measurement step 304 may generate information as to dynamic unbalance, such as, mass and angle information for removal or addition of mass from an assembly. The aforementioned commercially available balancing machines include circuitry (and/or software) that can measure dynamic unbalance in two planes and can convert unbalance measurement values to correction information for one or more correction planes. Correction information may indicate, for example, removal of 1 gm of mass at an angle of 20° to achieve an acceptable level of dynamic unbalance, noting that some level of dynamic unbalance will always exist. Thus, where the level of dynamic unbalance falls below a predetermined limit, then the measurement step 306 may indicate that the assembly is "OK". Where the level of dynamic unbalance exceeds a predetermined upper limit, then the measurement step 306 may indicate that the assembly is not OK, i.e., "NOK". While removal and/or addition of mass may be corrective actions, such an indication may require disassembly of the core, replacement of one or more components followed by reassembly and balancing of the core.

A balancing machine may include circuitry and/or software that provides for measurement assessment, correction calculation and control, fault diagnostics, statistical process control, and data transfer. A machine may allow for selection of type or types of correction to take after a measurement (e.g., polar or in components, in metric or imperial units, as digital values, vector displays or color graphics). A machine may provide for correction information automatically whether corrections occur through drilling, milling, welding, grinding, classification, in components or polar, in one or more planes, in multiple processing steps, in fixed or iterative systems. Through use of sensors, a machine may provide for measurement and optionally feedback for positioning a workpiece and/or a tool.

For balancing assemblies that include non-preloaded or centrifugally pre-loaded angular contact ball bearing cartridges, the method 300 proves problematic. As already mentioned, such cartridges can experience walking at low rotational speeds, which can cause unpredictable variations in measurements.

As shown in FIGS. 2 and 3, the bearing cartridge 230 includes an inner race 232, two sets of bearings 234, 234' and an outer race 236. An internal radial clearance exists $\Delta r_{internal}$ between each set of bearings 234, 234' and the outer surface of the inner race 232 (e.g., at $r_{IR,O}$) and the inner surface of the outer race 236 (e.g., at $r_{OR,I}$). These clearances allow the inner race 232 to move slightly off axis and to tilt with respect to the outer race 236. In FIG. 3 the dashed axial line representing the axis of the outer race 236 ($Z_{OR}$), the dotted axial line representing the rotational axis of the inner race 232 ($Z_{IR}$) and the angle $\Theta_{internal}$ formed between these two axes, which may vary over time. Further, the inner race 232 may translate with respect to the outer race 236, as indicated by a thick double headed arrow and the axial distance $\Delta z_{internal}$, which may vary over time (e.g., as measured by a difference between an axial mid-point of the outer race 236 and an axial mid-point of the inner race 232). As the radius of the inner surface of the outer race 236 ($r_{OR,I}$) increases toward the ends of the bearing cartridge 230, translation of the inner race 232 with respect to the outer race 236 can alter internal clearances ($\Delta r_{internal}$), as can changes in tilt angle ($\Theta_{internal}$).

Yet further, the outer race 236 may move in the bore of the center housing 210 as it floats on a lubricant film. Such movement may include off axis displacement and/or tilt where the tilt forms an angle $\Theta_{damper}$ between the axis of the outer race 236 ($Z_{OR}$) and the axis of the bore of the center housing 210 ($Z_B$). Consider parameters such as $\Theta_{damper}$, $\Delta z_{damper}$, $\Delta r_{damper}$, which may vary with respect to time (e.g., where $\Delta z_{damper}$ may be a difference between an axial mid-point of the outer race 236 and an axial mid-point of a housing bore and where $\Delta r_{damper}$ may be a difference between an outer diameter of the outer race 236 and an inner diameter of a housing bore). Air drive of a CHRA, per the conventional method 300, usually results in movement of the inner race 232 with respect to the outer race 236 and/or the outer race 236 with respect to the bore of the center housing 210. Thus, when a bearing cartridge is positioned in a housing, multiple angles (e.g., $\Theta_{damper}$, $\Theta_{internal}$), clearances ($\Delta r_{damper}$, $\Delta r_{internal}$) and axial displacements ($\Delta z_{damper}$, $\Delta z_{internal}$) may exist, which can confound balancing.

As described herein, an exemplary method loads a bearing cartridge to reduce or eliminate undesirable movement of an inner race with respect to an outer race and/or undesirable movement of an outer race with respect to the bore of a center housing.

Figure 4:
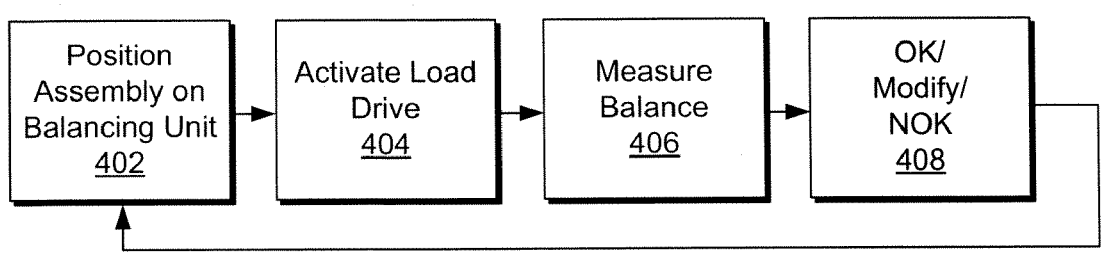
FIG. 4 is a block diagram of an exemplary method and a cross-sectional view of a bearing cartridge to illustrate loading that reduces undesirable movements.
Figure 4:
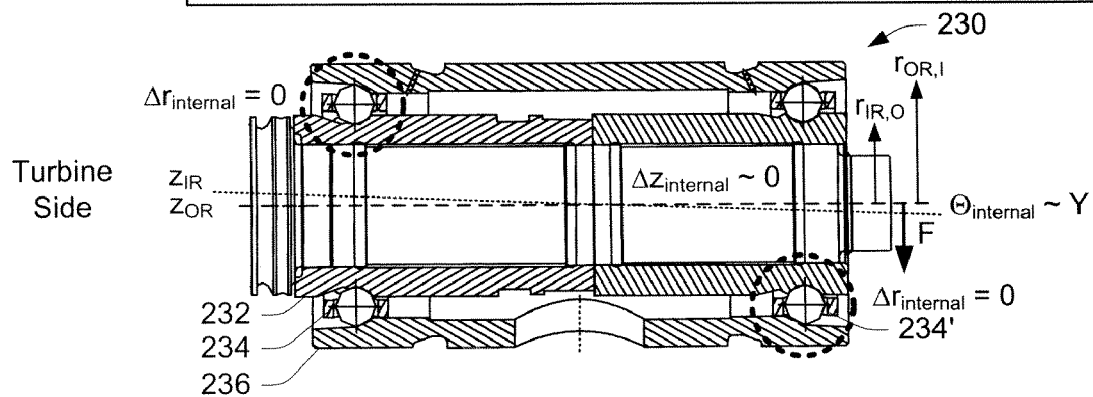

FIG. 4 shows an exemplary balancing method 400 with reference to a cross-sectional view of an assembly that includes the shaft 220 and the bearing cartridge 230 of FIG. 2. The method 400 commences in a positioning step 402 that includes positioning an assembly on a balancing unit. The balancing unit may include various features of aforementioned commercially available balancing units for turbocharger assemblies, however, as described herein, the positioning step 402 includes loading the bearing cartridge 230. For example, a belt may be used to rotate the shaft where the belt applies a force to the shaft (e.g., as indicated by the downwardly directed force arrow).

According to the method 400, the applied force causes the inner race 232 to tilt at a small angle (e.g., Y<about 5°) with respect to the axis of the outer race 236. This predictable amount of tilt causes a reduction in the internal clearance ($\Delta r_{internal}$) at the upper portion of the turbine side of the bearing cartridge 230 and at the lower portion of the compressor side of the bearing cartridge 230 (or vice versa). In particular, the tilt causes the inner race 232 to contact the outer race 236 via the bearing 234 and the bearing 234'. The applied force typically aims to maintain a certain amount of tilt, which, in turn, can reduce undesirable movement of the inner race 232 with respect to the outer race 236. For example, the applied force can reduce translation of the inner race 232 with respect to the outer race 236 and/or time varying tilt of the inner race 232 with respect to the outer race 236. Thus, such an approach applies a force to impart a substantially constant $\Theta_{internal}$ (and/or $\Theta_{damper}$) and $\Delta r_{internal}$ (e.g., two values for each bearing set, approximately 0 mm and some other value for an opposing side), which, in turn, can also reduce magnitude of $\Delta z_{internal}$ (and/or $\Delta z_{damper}$) and axial movement with respect to time.

The method 400 then proceeds in an activation step 404 that activate a drive to rotate the rotating components. The drive may apply the load or a load may be applied separately. In either instance, the exemplary method 400 introduces a tilt that causes the assembly to maintain a more stable configuration during balancing when compared to the conventional method 300. A measurement step 406 commences once the rotating components achieve a desired speed. The balancing method 400 may include use of a conventional measuring technique, for example, as described with respect to the conventional method 300. Further, an action step 408, which represents some possible actions following the measurement step 406, may include any of the actions described with respect to the conventional method 300.

An exemplary method for balancing a rotating assembly of a turbocharger includes loading the rotating assembly to introduce a tilt between the rotational axis of an inner race of the bearing cartridge and a bore axis of an outer race of the bearing cartridge, rotating the inner race with respect to the outer race at a rotational speed less than approximately 5,000 rpm while maintaining the tilt at substantially constant angle and measuring dynamic unbalance of the rotating assembly. After such measuring, one or more actions may be taken and the process repeated, as appropriate or desired.

As described herein, a rotating assembly may include a center housing with a bearing cartridge bore to receive a bearing cartridge of the rotating assembly or a rotating assembly may cooperate with a clamp to clamp the bearing cartridge of the rotating assembly. Such a clamp may allow for a damper clearance or it may fix the outer race of the bearing cartridge. A center housing and/or a clamp may include an anti-rotation mechanism to limit rotation of an outer race of a bearing cartridge. Such a mechanism may allow for some minimal rotation or may fix the bearing cartridge in a manner that essentially prevents rotation of the outer race.

As described herein, an exemplary method may use loading to introduce a tilt angle between the bore axis of an outer race of a bearing cartridge and a bearing cartridge bore axis of a center housing. Such loading typically creates an asymmetry in the lubricant film. For example, such loading may cause the outer race to contact the bore of the center housing at one or more points. Where the load is maintained during balancing, movement of the outer race with respect to the bore of the center housing is reduced.

As already explained, a bearing cartridge may include one or more sets of bearings. For example, the cartridge 230 includes a first set of bearings 234 disposed radially between the inner race 232 and the outer race 236 and a second set of bearings 234' disposed radially between the inner race 232 and the outer race 236. Loading can cause the inner race 232 to contact the outer race 236 via the first set of bearings 234 and via the second set of bearings 234'.

As described in more detail below, a method may include positioning a belt on a portion of the rotating assembly where the belt provides for loading and/or rotating. The portion of the rotating assembly may have a polygonal or other shaped cross-section substantially centered on the rotational axis of the inner race of the bearing cartridge. Noise introduced by a belt positioned on a portion of the rotating may occur, depending on the belt and the cross-sectional shape of the portion, at a frequency greater than once per revolution of the inner race of the bearing cartridge. A balancing unit may use filtering to filter noise introduced by loading and/or rotating techniques. Again, the loading aims to reduce undesirable movement of the inner race with respect to the outer race of the bearing cartridge and thus provide for more reliable low-speed balancing. Such undesirable movement may be axial translation and/or radial translation of the inner race with respect to the outer race.

An exemplary balancing method may include use of a balancing machine or other unit that includes circuitry (and/or software) that can control and/or monitor the amount of load applied to an assembly. Such a method may include use of techniques that select a load based at least in part on one or more balancing measurements. For example, a load may be increased until variations in balancing measurements achieve a desired stability (e.g., a reduction in variation, etc.).

Figure 5:
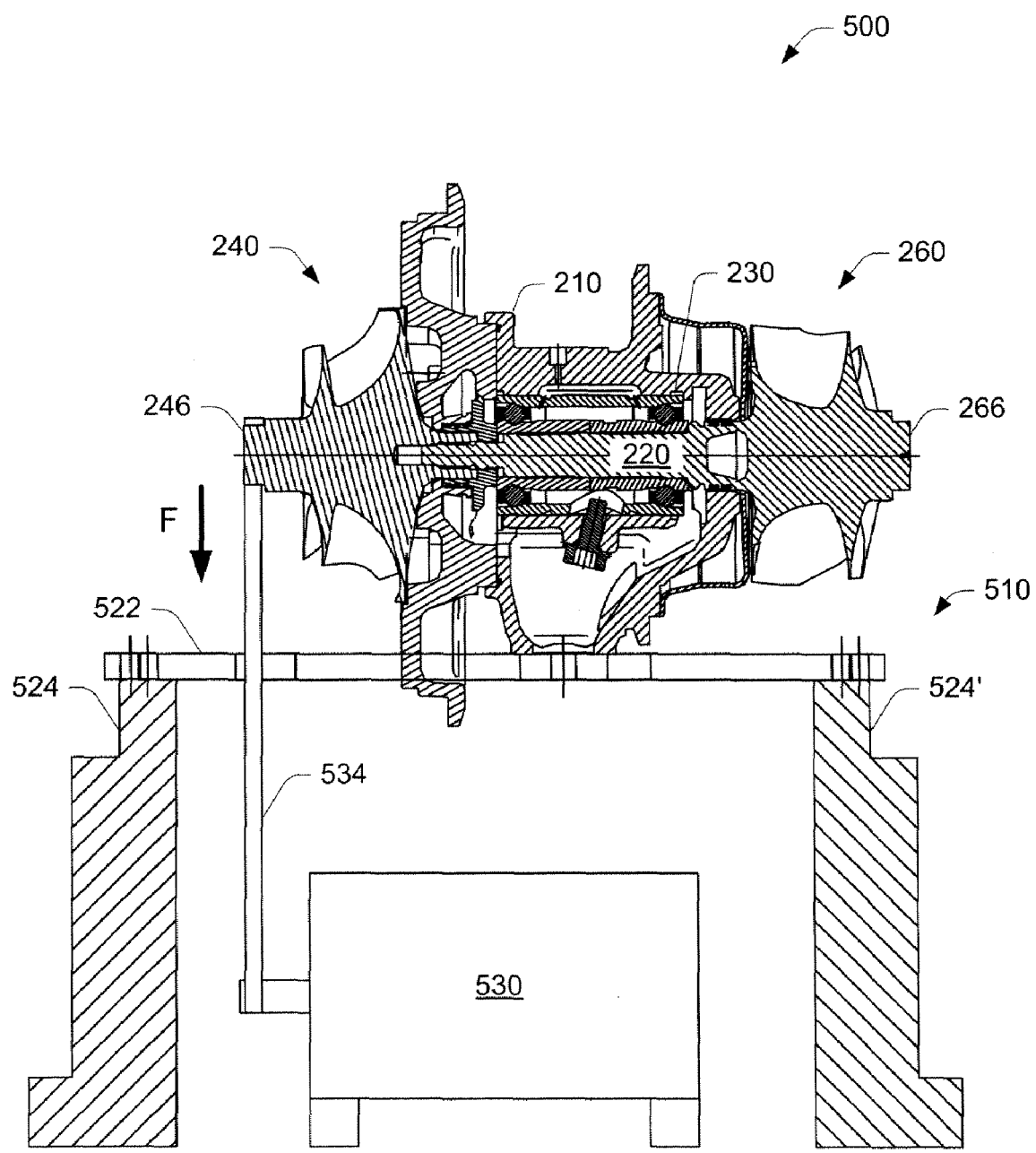
FIG. 5 is a cross-sectional view of an arrangement that includes a rotating assembly mounted to a balancing unit along with a belt and a drive to load and rotate various components of the rotating assembly.

FIG. 5 shows an exemplary arrangement 500 of a turbocharger CHRA mounted on a balancing unit 510 and driven by a belt 534 and motor 530. In this example, the belt 534 is positioned on the nose 246 of the compressor wheel 240. While the nose 246 may have a hexagonal or other non-circular cross-section that may introduce noise, if the noise occurs at a frequency greater than once per revolution, then this noise typically does not interfere with balance measurement or it can be removed via filtering. For example, a hexagonal nose may be expected to introduce six artifacts per revolution of the rotating group whereas balance measurements typically aim to identify unbalance that occurs once per revolution.

An exemplary balancing method may include use of a belt positioned over a nose of a wheel, over blades of a wheel, etc., where noise introduced occurs on a frequency greater than once per revolution of a rotating group. Where a surface with a circular cross-section is used, any run-out of the surface may introduce noise that may be more difficult to account for or filter out when compared to, for example, a surface with a polygonal (e.g., hex nose) or other (e.g., wheel blades) cross-section.

Referring again to the arrangement 500, the balancing unit 510 includes a platform 522 supported by two posts 524, 524'. The CHRA mounts to the platform 522 and one or both of the posts 524, 524' include a vibration sensor or transmit vibration to a vibration sensor. The balancing unit 510 may be or may include various features of a conventional balancing unit, provided that the unit allows for appropriate loading, as already described with respect to FIG. 4. As shown in FIG. 5, the belt 534 applies a load that causes the shaft 220 to tilt with respect to the outer race of the bearing cartridge 230, which, in turn, acts to stabilize the bearing cartridge 230 in the center housing 210. In this example, the load may cause the outer race 236 to tilt with respect to the bore of the center housing 210 to reduce the damper clearance. Thus, the load may reduce internal clearance and damper clearance in a manner to stabilize the bearing cartridge 230 during balancing.

Figure 6:
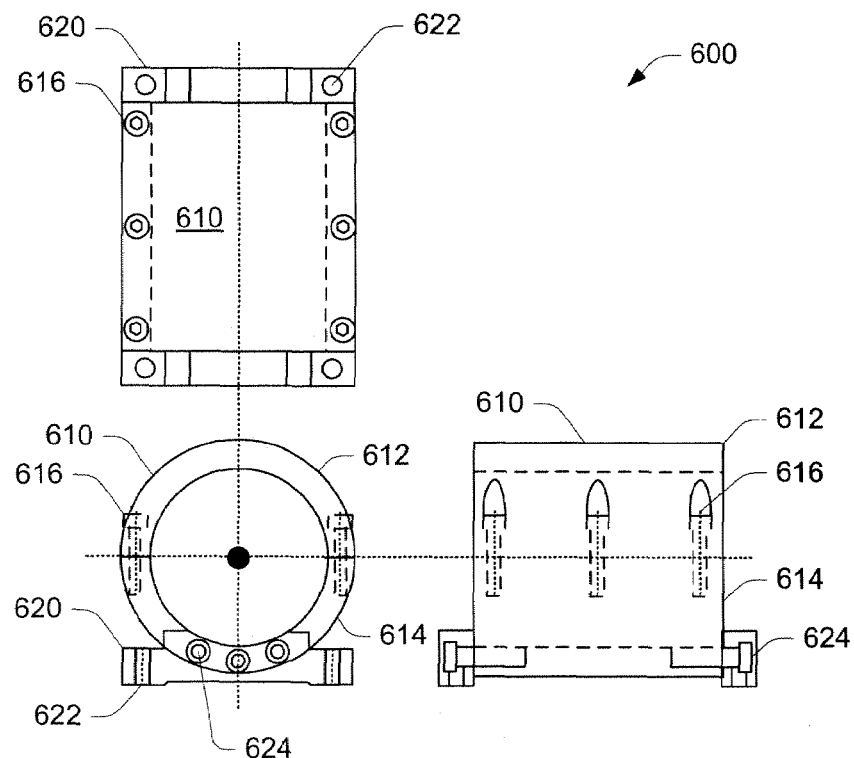
FIG. 6 is an end view, a top view and a side view of a holder to hold a bearing cartridge.

While the arrangement 500 of FIG. 5 shows the bearing cartridge 230 positioned in a center housing 210, a bearing cartridge may be positioned with respect to a holder such as the holder 600 of FIG. 6. Such a holder may allow for tilt of a bearing cartridge or it may hold a bearing cartridge with minimal tilt. Such a holder may be adjustable to allow a bearing cartridge to tilt with respect to a balancing unit (e.g., a balancing stand, etc.). For example, where a load achieves a known amount of tilt, a holder may be adjusted such that the "tilted" inner race is substantially normal with respect to gravity.

The holder 600 of FIG. 6 includes a clamp 610 that mounts to a base 620. The clamp 610 includes a lower portion 614 and an upper portion 616. Bolts 616 allow these two portions 614, 616 to clamp the outer race of a bearing cartridge. The base 620 includes features (e.g., apertures 622) for attachment to a balancing unit and features 624 for attachment to the clamp 610. An end view of the holder 600 indicates a central axis. In some examples, more than one holder may be used and, in such an example, the holders may be aligned along a central axis.

Figure 7:
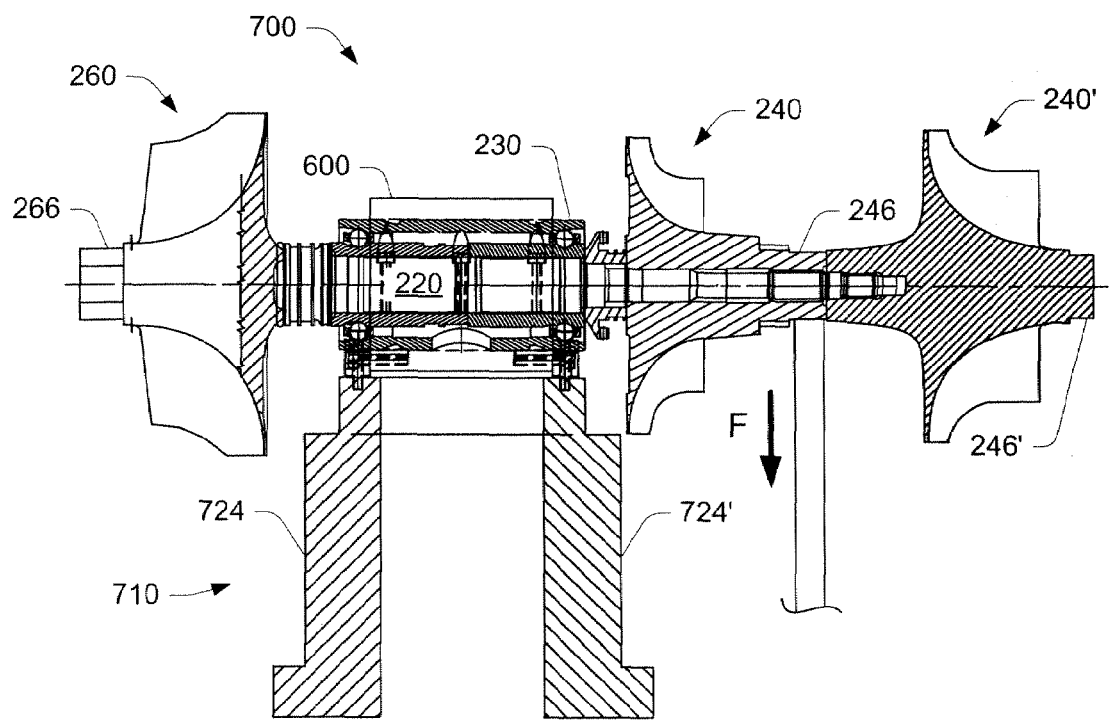
FIG. 7 is a cross-sectional view of an arrangement that includes a rotating assembly mounted to a balancing unit using the holder of FIG. 6.

FIG. 7 shows an exemplary arrangement 700 where the holder 600 holds a bearing cartridge 230 to a stand 710. In particular, the holder 600 attaches to a first component 724 and a second component 724' of the stand 710. In the example of FIG. 7, the CHRA includes two compressor wheels 240, 240' where a belt may be positioned at a nose end 246 of the inner wheel 240 to apply a load an drive the rotating components of the assembly. A holder may allow a bearing cartridge or a bearing set (or sets) to tilt in the holder or the holder may prevent such tilting (e.g., depending on clearance between outer radius of a bearing set or bearing cartridge and inner radius of a holder).

Figure 8:
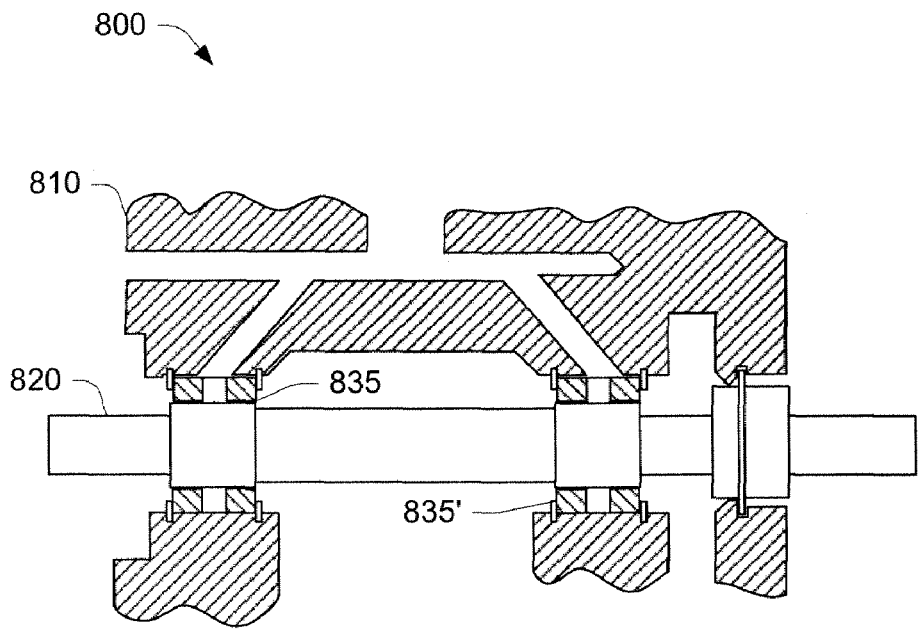
FIG. 8 is a cross-sectional view of a prior art journal bearing arrangement of a rotating assembly.

FIG. 8 shows a prior art a cross-sectional view of a journal bearing arrangement of a rotating assembly 800. The assembly 800 includes a housing 810 that supports two bearings 835, 835' and a shaft in a bore. Various lubricant flow paths are also shown. Conventional balancing may use a method such as the conventional method 300 of FIG. 3.

Figure 9:
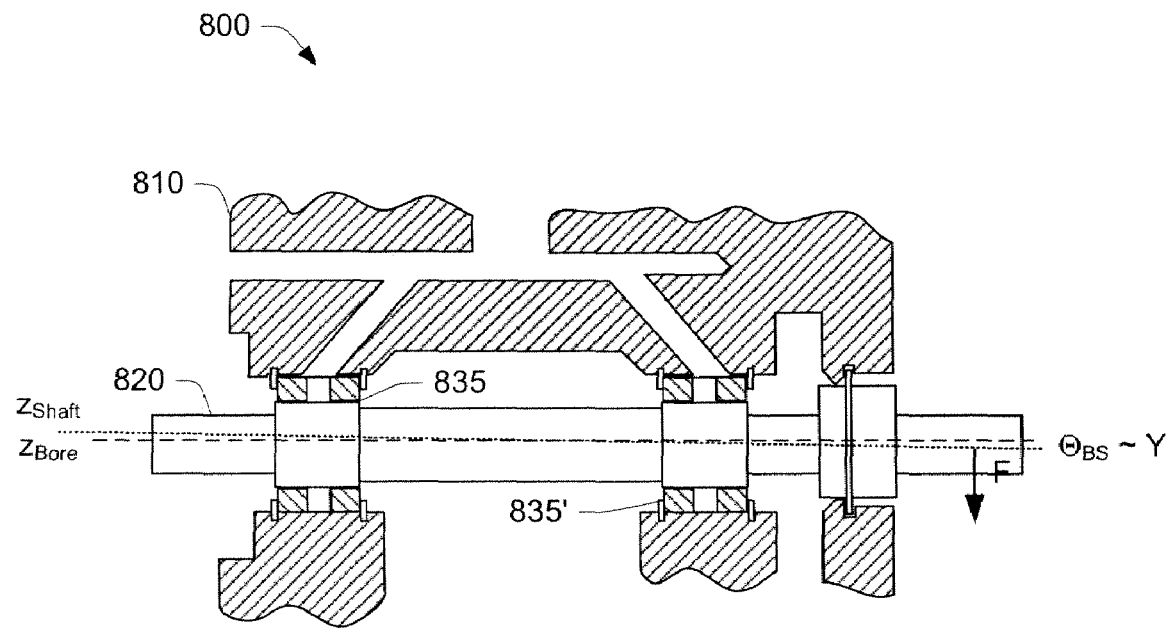
FIG. 9 is a cross-sectional view of the arrangement of FIG. 8 where a load applied to the assembly, according to an exemplary method, introduces a tilt.

Various exemplary techniques described herein may be used for balancing such the rotating assembly of FIG. 8. For example, the method 400 of FIG. 4 may be used for balancing the assembly of FIG. 8. FIG. 9 shows the arrangement 800 of FIG. 8 together with tilt ($\Theta_{BS}$) of the shaft 820 (axis $z_{Shaft}$) with respect to the bore of the housing 810 (axis $z_{Bore}$). The tilt will normally be some small angle, which may depend on an intended film thickness, tolerances, etc. The holder 600 may accommodate the bearings 835, 835' or two separate holders may be used, for example, one for each bearing to mount the bearings 835, 835' to a balancing unit. Alternatively, the housing 810 may mount to a balancing unit. Clearances exist in the arrangement 800 between various components. An exemplary method may include applying a force to achieve a tilt to thereby reduce undesirable movements of the arrangement 800 and facilitate balancing.

While various examples discuss turbochargers, various techniques and equipment described herein may be used to balance rotating assemblies for use in applications other than turbochargers.

An exemplary balancing unit includes a belt, a drive, a stand, one or more transducers (e.g., vibration, force, velocity, motion, etc.) and control logic to measure dynamic unbalance of a rotating assembly of a turbocharger mounted to the stand, based at least in part on information sensed by the one or more transducers. As described herein, the rotating assembly may include a non-preloaded angular contact ball bearing cartridge or a centrifugally pre-loaded angular contact ball bearing cartridge. The belt of such a balancing unit may load a rotating assembly to introduce a tilt between the rotational axis of an inner race of a bearing cartridge and a bore axis of an outer race of a bearing cartridge. The drive of such a balancing unit may rotate the inner race with respect to the outer race (e.g., via the belt) at a rotational speed less than approximately 5,000 rpm while maintaining the tilt at substantially constant angle.

A balancing unit may include use of a holder to hold an outer race of a bearing cartridge. Such a holder may include a base that provides a mechanism to attach the rotating assembly to a stand of the balancing unit. Where a rotating assembly includes a center housing, the center housing may mounts to a stand of the balancing unit.

An exemplary method for balancing a rotating assembly, where the assembly includes a shaft rotatably supported by at least two sets of bearings disposed in a bore, the bore having a bore axis, may include loading the rotating assembly to introduce a tilt between the rotational axis of the shaft and the bore axis, rotating the shaft at a rotational speed less than approximately 5,000 rpm while maintaining the tilt at substantially constant angle and measuring dynamic unbalance of the rotating assembly. In such an example, the rotating assembly may be a rotating assembly of a turbocharger.

An exemplary method for balancing a rotating assembly, where the rotating assembly includes a shaft rotatably supported by a bearing cartridge, may include loading the rotating assembly to introduce a tilt between the rotational axis of an inner race of the bearing cartridge and a bore axis of an outer race of the bearing cartridge, rotating the inner race with respect to the outer race at a rotational speed less than approximately 5,000 rpm while maintaining the tilt at substantially constant angle, and measuring dynamic unbalance of the rotating assembly. Such a method may include a housing that supports the rotating assembly in a bore, the bore defined by a bore surface of the housing. In such a method loading can introduce a tilt between the bore axis of the outer race of the bearing cartridge and the bore of the housing. A holder or other component may be used to clamp an outer race of the bearing cartridge.

An exemplary balancing unit includes a belt, a drive, a stand, one or more transducers and control logic to measure dynamic unbalance of a rotating assembly mounted to the stand, based at least in part on information sensed by the one or more transducers where the rotating assembly includes a bearing cartridge, where the belt loads the rotating assembly to introduce a tilt between the rotational axis of an inner race of the bearing cartridge and a bore axis of an outer race of the bearing cartridge and where the drive rotates the inner race with respect to the outer race of the bearing cartridge at a rotational speed less than approximately 5,000 rpm while maintaining the tilt at substantially constant angle.

An exemplary balancing unit includes a belt, a drive, a stand, one or more holders aligned along a central axis, one or more transducers and control logic to measure dynamic unbalance of a rotating assembly mounted to the stand, based at least in part on information sensed by the one or more transducers where the rotating assembly comprises at least two sets of bearings supported by the one or more holders where the at least two sets of bearings rotatably support a shaft and where the belt loads the rotating assembly to introduce a tilt between the rotational axis of the shaft and the central axis of the one or more holders and where the drive rotates the shaft at a rotational speed less than approximately 5,000 rpm while maintaining the tilt at substantially constant angle.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A method for balancing a rotating assembly of a turbocharger, the rotating assembly comprising a shaft rotatably supported by a bearing cartridge, the method comprising:
   loading the rotating assembly to introduce a tilt between the rotational axis of an inner race of the bearing cartridge and a bore axis of an outer race of the bearing cartridge;
   rotating the inner race with respect to the outer race at a rotational speed less than approximately 5,000 rpm while maintaining the tilt at substantially constant angle; and
   measuring dynamic unbalance of the rotating assembly.

2. The method of claim 1 wherein a center housing supports the rotating assembly in a bore.

3. The method of claim 1 further comprising clamping the outer race of the bearing cartridge.

4. The method of claim 1 wherein the bearing cartridge comprises a non-preloaded angular contact ball bearing cartridge.

5. The method of claim 1 wherein the bearing cartridge comprises a centrifugally pre-loaded angular contact ball bearing cartridge.

6. The method of claim 1 wherein the rotating assembly comprises a turbine wheel attached to the shaft and a compressor wheel attached to the shaft.

7. The method of claim 2 further comprising an anti-rotation mechanism to limit rotation of the outer race of the bearing cartridge with respect to the center housing.

8. The method of claim 2 wherein the loading introduces a tilt between the bore axis of the outer race of the bearing cartridge and a bearing cartridge bore axis of the center housing.

9. The method of claim 1 wherein the bearing cartridge comprises a first set of bearings disposed radially between the inner race and the outer race and a second set of bearings disposed radially between the inner race and the outer race wherein the loading causes the inner race to contact the outer race via the first set of bearings and via the second set of bearings.

10. The method of claim 1 wherein the loading comprises positioning a belt on a portion of the rotating assembly.

11. The method of claim 1 wherein a drive belt provides for the loading and the rotating.

12. The method of claim 10 wherein the portion of the rotating assembly comprises a polygonal cross-section substantially centered on the rotational axis of the inner race of the bearing cartridge.

13. The method of claim 10 wherein noise introduced by the belt positioned on the portion of the rotating occurs at a frequency greater than once per revolution of the inner race of the bearing cartridge.

14. The method of claim 13 wherein the measuring comprises filtering the noise.

15. The method of claim 1 wherein the loading reduces undesirable movement of the inner race with respect to the outer race of the bearing cartridge.

16. The method of claim 15 wherein the undesirable movement comprises axial and/or radial translation of the inner race with respect to the outer race.

17. The method of claim 2 wherein the loading reduces undesirable movement of the outer race with respect to the bore the center housing.

18. The method of claim 17 wherein the undesirable movement comprises axial and/or radial translation of the outer race with respect to the bore of the center housing.

19. A balancing unit comprising:
   a belt;
   a drive;
   a stand;
   one or more transducers; and
   control logic to measure dynamic unbalance of a rotating assembly of a turbocharger mounted to the stand, based at least in part on information sensed by the one or more transducers wherein the rotating assembly comprises a non-preloaded angular contact ball bearing cartridge or a centrifugally pre-loaded angular contact ball bearing cartridge, wherein the belt loads the rotating assembly to introduce a tilt between the rotational axis of an inner race of the bearing cartridge and a bore axis of an outer race of the bearing cartridge and wherein the drive rotates the inner race with respect to the outer race of the bearing cartridge at a rotational speed less than approximately 5,000 rpm while maintaining the tilt at substantially constant angle.

20. The balancing unit of claim 19 further comprising a holder to hold the outer race of the bearing cartridge.

21. The balancing unit of claim 20 wherein the holder comprises a base that provides a mechanism to attach the rotating assembly to the stand.

22. The balancing unit of claim 19 wherein a center housing supports the bearing cartridge and wherein the center housing mounts to the stand.

23. A method for balancing a rotating assembly, the rotating assembly comprising a shaft rotatably supported by at least two sets of bearings disposed in a bore, the bore having a bore axis, the method comprising:
   loading the rotating assembly to introduce a tilt between the rotational axis of the shaft and the bore axis;
   rotating the shaft at a rotational speed less than approximately 5,000 rpm while maintaining the tilt at substantially constant angle; and measuring dynamic unbalance of the rotating assembly.

24. The method of claim 23 wherein the rotating assembly comprises a rotating assembly of a turbocharger.

25. A method for balancing a rotating assembly, the rotating assembly comprising a shaft rotatably supported by a bearing cartridge, the method comprising:
- loading the rotating assembly to introduce a tilt between the rotational axis of an inner race of the bearing cartridge and a bore axis of an outer race of the bearing cartridge;
- rotating the inner race with respect to the outer race at a rotational speed less than approximately 5,000 rpm while maintaining the tilt at substantially constant angle; and
- measuring dynamic unbalance of the rotating assembly.

26. The method of claim 25 wherein a housing supports the rotating assembly in a bore, the bore defined by a bore surface of the housing.

27. The method of claim 26 wherein the loading introduces a tilt between the bore axis of the outer race of the bearing cartridge and the bore of the housing.

28. The method of claim 25 further comprising clamping the outer race of the bearing cartridge.

29. A balancing unit comprising:
- a belt;
- a drive;
- a stand;
- one or more transducers; and
- control logic to measure dynamic unbalance of a rotating assembly mounted to the stand, based at least in part on information sensed by the one or more transducers wherein the rotating assembly comprises a bearing cartridge, wherein the belt loads the rotating assembly to introduce a tilt between the rotational axis of an inner race of the bearing cartridge and a bore axis of an outer race of the bearing cartridge and wherein the drive rotates the inner race with respect to the outer race of the bearing cartridge at a rotational speed less than approximately 5,000 rpm while maintaining the tilt at substantially constant angle.

30. A balancing unit comprising:
- a belt;
- a drive;
- a stand;
- one or more holders aligned along a central axis;
- one or more transducers; and
- control logic to measure dynamic unbalance of a rotating assembly mounted to the stand, based at least in part on information sensed by the one or more transducers wherein the rotating assembly comprises at least two sets of bearings supported by the one or more holders where the at least two sets of bearings rotatably support a shaft and wherein the belt loads the rotating assembly to introduce a tilt between the rotational axis of the shaft and the central axis of the one or more holders and wherein the drive rotates the shaft at a rotational speed less than approximately 5,000 rpm while maintaining the tilt at substantially constant angle.

* * * * *